J. G. ELLENDT.
MOLDING MACHINE.
APPLICATION FILED APR. 2, 1910.
1,058,227.
Patented Apr. 8, 1913.
2 SHEETS—SHEET 1.
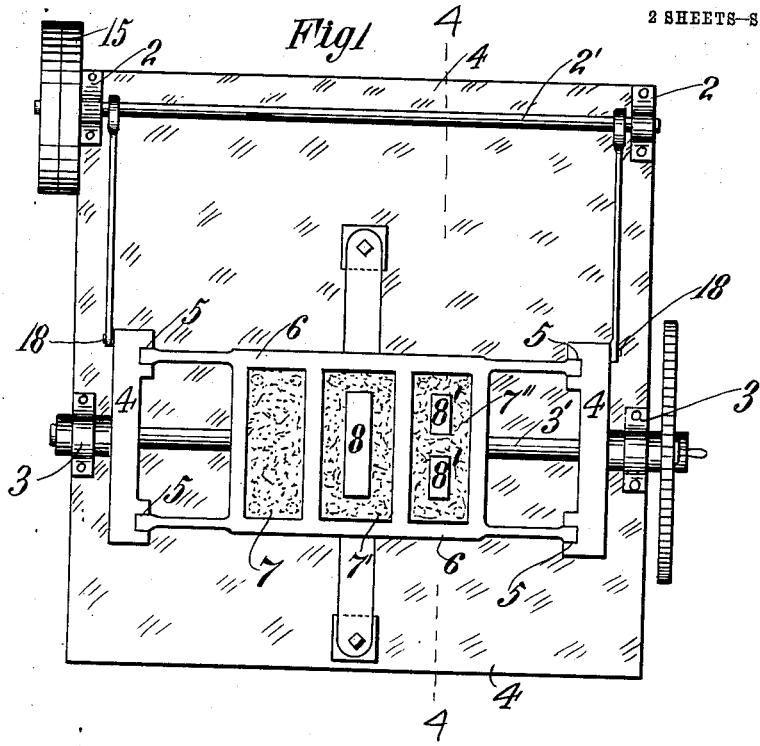
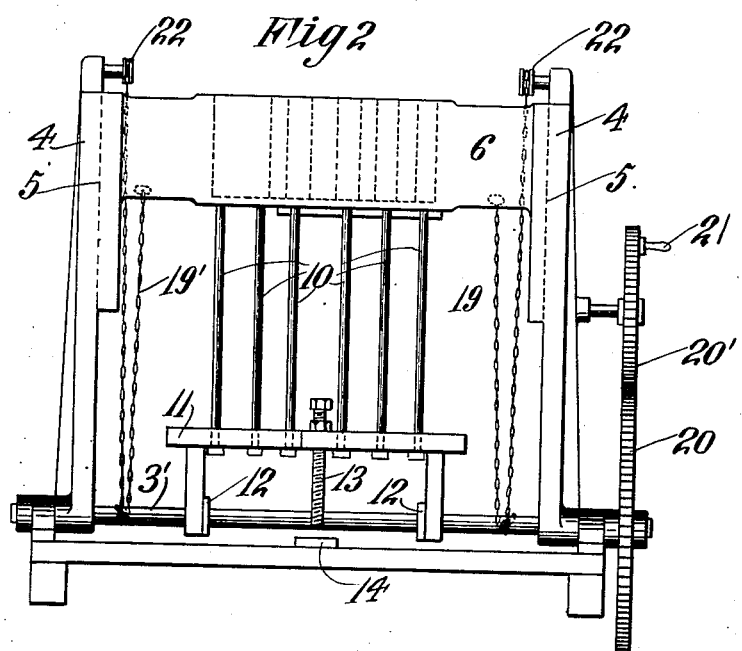
Witnesses:
John G. Ellendt, Inventor
By his Attorney

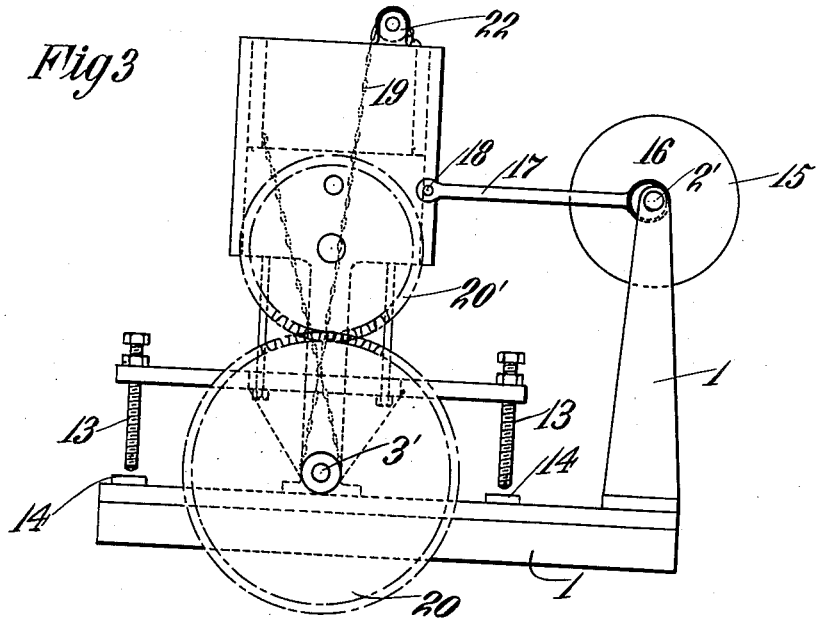
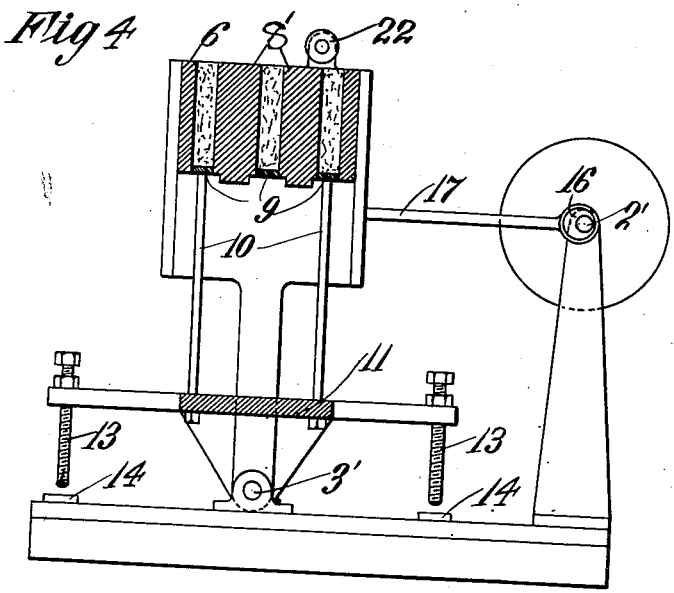

UNITED STATES PATENT OFFICE.

JOHN G. ELLENDT, OF ROCHESTER, NEW YORK.

MOLDING-MACHINE.

1,058,227.  Specification of Letters Patent.  Patented Apr. 8, 1913.

Application filed April 2, 1910. Serial No. 553,034.

*To all whom it may concern:*

Be it known that I, JOHN G. ELLENDT, a citizen of the United States, residing at Rochester, in the county of Monroe and State of New York, have invented certain new and useful Improvements in Molding-Machines, of which the following is a specification, reference being had therein to the accompanying drawing.

My invention relates to improvements in the manufacture of artificial stone and has for its object to improve the method of making same.

By the use of my invention I am able to produce a denser and better stone in less time than by any other method. The present method of making concrete stone requires a plastic mixture which is stiff and takes a large amount of tamping to place this mixture into the mold. This is both an expensive and unsatisfactory method. My invention eliminates the tamping entirely as my mold permits the use of a plastic mixture which is very soft and pliable and by means of oscillating, jarring or shaking the mold mechanically, I settle the plastic mixture into place and by the movement of the mold the excess moisture is driven off and the mass begins to settle very rapidly permitting the stone to be taken out in condition to stand handling very soon. The effect of this shaking, jarring or oscillating produces a very dense, solid and strong artificial stone.

The objects of my invention are preferably attained by a machine substantially as illustrated in the accompanying drawings in which—

Figure 1 is a plan view of a preferred form of machine. Fig. 2 a front elevation of the same. Fig. 3 a side elevation, and Fig. 4 a cross section on the line 4—4 of Fig. 1.

1 is the framework or base of the machine adapted to rest upon a floor or foundation and giving stability to the machine. To this frame are fastened the bearings 2 and 3 carrying the shafts 2'—3'. The shaft 2' through the rods 17, oscillates, shakes, or jars the standards 4 which are provided with grooves 5 in which the mold 6 is held in position. These grooves permit of raising or lowering the mold to release the cast by mechanism to be hereinafter described.

The mold 6 may have any number of compartments, the shape and size of the same conforming to requirements. By preference I have shown in these drawings three compartments, 7, 7' and 7'', the compartment 7 is to cast a solid stone, compartment 7' for a stone with a single core 8 and compartment 7'' for double core 8'. The pallets 9 are loose and are simply supported in their positions for casting by the vertical rods 10 which in turn are fastened in the saddle 11. The saddle 11 rests loosely upon the shaft 3' and is held in its proper position by the collars 12. This saddle 11 is also provided at its ends with set screws 13 which are adjusted so that when the mold is rocking or oscillating at a high rate of speed, which motion is communicated by the eccentrics 16 mounted upon the shaft 2', the end of these set screws strike the rubber bumpers 14 which are fastened to the frame 1. The oscillating rocking, vibrating, jarring or other motion may be obtained in a number of ways. In the machine illustrated power is transmitted to the pulley 15, driving the shaft 2' which in turn reciprocates the rods 17 by the eccentric 16.

The cast is made when the machine is at rest. The machine is then set in motion and the mold begins to oscillate and the pallets are jarred at the bottom by the set screws 13 striking the rubber bumpers 14. The plastic mixture immediately begins to harden and is shortly ready to be taken out. To release this cast I have provided the mold with an apparatus to drop the cast downward. This is accomplished preferably by means of chains 19—19' which are secured to the mold 6 passing over the sheaves 22 passing around the shaft 3'.

20 is a gear mounted upon the shaft 3' and meshing with the gear 20' provided with the handle 21 so that upon turning the gear 20', the mold can be raised or lowered at will.

Of course it will be understood that various modifications may be made without departing from the spirit of the invention as set forth in the claim.

Having described my invention, what I claim as new, and desire to secure by Letters Patent, is:

In a molding machine, a mold, a frame in which said mold is moved, said frame having a transverse axis and providing a vertical slideway and a bottom for said mold, means for rocking said frame upon said axis, means for raising and lowering said mold in said slideway, said last mentioned means comprising supporting means above said mold and flexible connection secured to said mold and passing over said supporting means and around said axis, and means for rotating said axis to strip said mold.

In testimony whereof I affix my signature in presence of two witnesses.

JOHN G. ELLENDT.

Witnesses:
 THOMAS A. HILL,
 LOUISE ENDERLE.